United States Patent Office 3,168,154
Patented Feb. 2, 1965

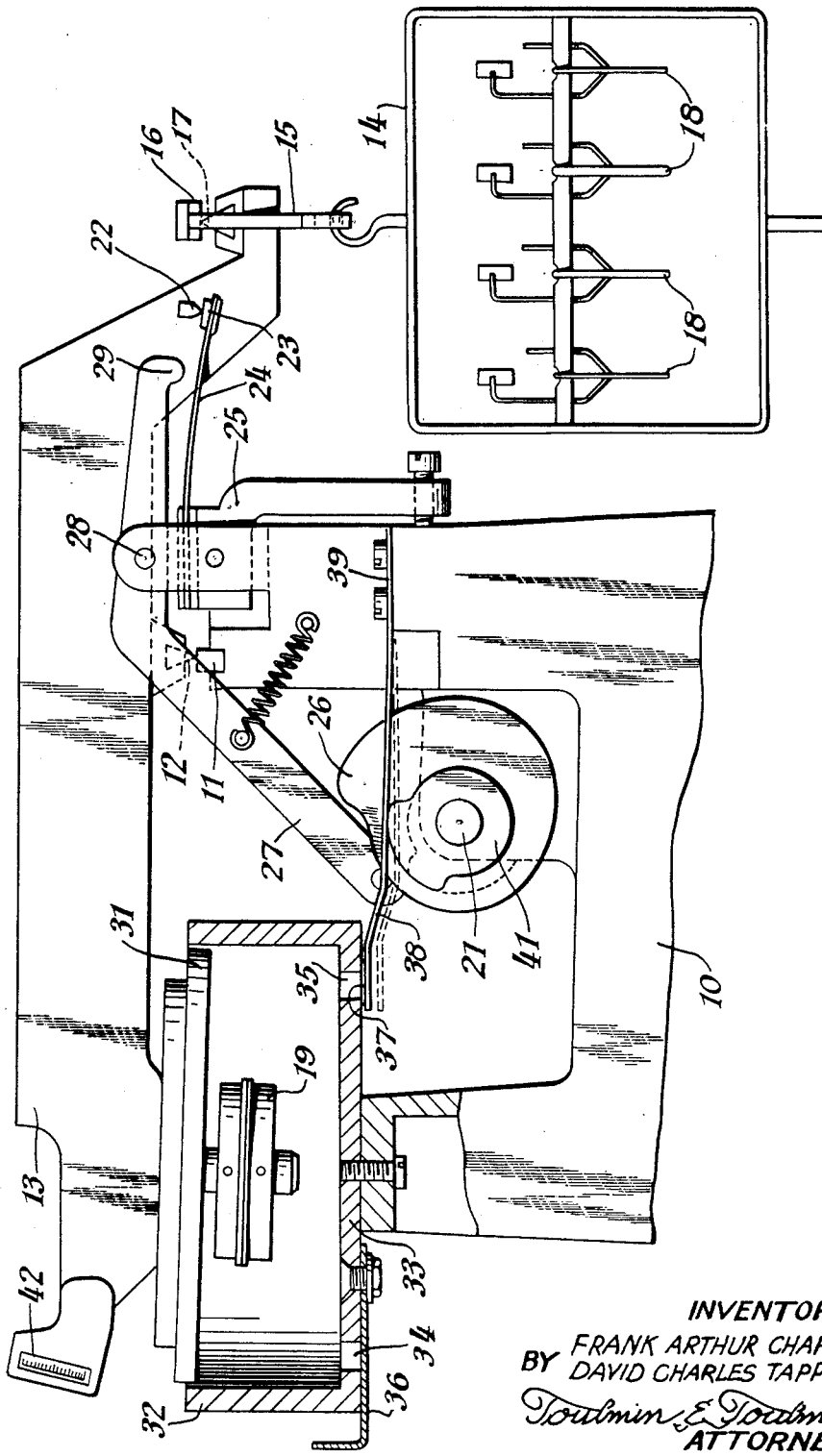

3,168,154
BALANCES FOR FINE WEIGHING
Frank Arthur Chappell, Orpington, and David Charles Tappin, Chipstead, near Sevenoaks, England, assignors to L. Oertling Limited, Orpington, Kent County, England, a British company
Filed Sept. 9, 1963, Ser. No. 307,497
Claims priority, application Great Britain, Sept. 13, 1962, 34,998/62
3 Claims. (Cl. 177—251)

This invention relates to balances for fine weighing. It has been proposed to provide such balances with a pre-weighing device capable of being brought into operation as a preliminary step in a weighing operation to indicate approximately the value of weights necessary to balance the object being weighed, thereby reducing the number of trial weighings required before a true measure of the weight is obtained, or even enabling the first weight applied to produce a degree of balance within the range of the fine reading system of the balance.

It has been proposed to carry out the pre-weighing by allowing the balance beam, when deflected by a dis-equilibrium exceeding a predetermined value, to engage with means applying an opposing force to the beam movement, and thereby provide information regarding the weights needed to achieve equilibrium. The proposed arrangement has certain disadvantages, one of which is that the beam has to turn through a larger angle than would normally be necessary, and it is the main object of the present invention to provide an improved arrangement which avoids these disadvantages.

It is known to provide damping of the movement of a balance beam by means of a piston moving in a cylinder to displace air through a restricted passage, such as a small clearance between the piston and the surrounding wall of the cylinder, so as to enable the beam to come rapidly to an equilibrium position and eliminate or greatly reduce the oscillation of the beam before it comes to rest. If such a damping device is employed on a balance including a pre-weighing device, and is adjusted to provide the degree of damping required for fine weighing, it has very little effect during pre-weighing because the balance is then, in effect working at a much lower sensitivity and consequently needs a much greater degree of damping to bring the beam to rest quickly.

It is a further object of the present invention to provide a balance having a pre-weighing device and air damping, in which the damping device is able to provide effective damping during both pre-weighing and fine weighing operations.

According to the present invention, in a balance for fine weighing having a pre-weighing device embodied therein, the said device comprises means arranged to exert a force opposing the out-of-balance load acting on the balance beam when an article to be weighed is positioned on the balance pan and control means for selectively applying to the beam, and relieving the beam of, said opposing force whilst the said beam is within its normal range of movement so that the deflection of the beam when the said force is applied thereto can be read on the normal balance scale.

The said control means may be so associated with the arrestment mechanism of the balance that the balance beam can be moved from the arrested position either to a pre-weighing position in which the opposing force acts thereon, or to a fine weighing position in which the beam is relieved of the said force.

The opposing force may be exerted by a spring, the control means being operable to deflect the said spring to such a position that the balance beam can swing through its normal arc of movement without contacting the said spring.

Damping means may be provided to act on the balance beam and may comprise a piston moving in a cylinder during swinging of the balance beam to displace air from or draw air into the said cylinder, an air flow orifice in the cylinder wall which is open when the balance beam is released for fine weighing being closed when the beam is released for pre-weighing.

The opening and closing of the said orifice may be effected by movement of a pad mounted on a resilient arm which is in turn acted on by a cam rotated by the arrestment mechanism of the balance, the cam loading the spring to press the pad against the orifice when the balance beam is released for pre-weighing.

The invention is hereinafter described with reference to the accompanying drawing, the single figure of which shows in side elevation, and in somewhat diagrammatic form, the beam and adjacent parts of one construction of balance embodying the invention, the said parts being in the released position for pre-weighing.

The balance shown in the drawing comprises a fixed frame 10 carrying a pad 11 on which rests a knife edge 12 on the balance beam 13 when the balance is released for operation, articles to be weighed being supported in a scale pan (not shown) supported from and below a weight carrier 14 suspended from a hanger 15 having a pad 16 supported on a knife edge 17 carried by the beam 13. Weights 18 are selectively liftable from the carrier 14 in the known manner.

A counterweight 19 mounted on the beam counterbalances the scale pan, weight carrier and weights so that the beam 13 is in balance with no load in the scale pan and with all the weights applied.

The usual arrestment frame is provided to lift the beam knife edge 12 off the pad 11, and to lift the hanger pad 16 off the knife edge 17. The arrestment frame is not shown in the drawing, but is operated by rotary movement of a spindle 21.

An auxiliary knife edge 22 is secured to the beam 13 acts on a pad 23 carried by a blade spring 24 which is itself mounted on a bracket 25 pivoted on, and adjustable relative to the frame 10. The spring 24, when not restrained from so doing, acts through the pad 23 and the knife edge 22 on the balance beam to oppose the action of an excess weight at the scale pan end as compared with the counterweight.

A cam 26 on the arrestment shaft 21 co-operates with a lever 27 pivoted at 28 on the frame 10, the lever 27 having a nose 29 which can act on the spring 24 to deflect it away from the knife edge 22, leaving the balance beam 13 free to swing through its normal arc of movement without the knife edge 22 contacting the pad 23, thus rendering the spring 24 ineffective. The other arm of the lever 27 carries a follower engaging the cam 26, and the said cam is so positioned on the arrestment shaft 21 that, when the balance beam is released for pre-weighing the spring 24 is free, but when the balance beam is released for fine weighing the spring 24 is deflected away from the knife edge 22. The spring 24 may be free when the beam is arrested but with the pad 23 out of contact with the knife edge 22.

The counterweight 19 is mounted on a piston 31 carried by the balance beam 13 and lies within a cup-like cylinder 32 in which the said piston operates, the cylinder 32 being fixed to the frame 10. The piston 31 is of such a size relative to the cylinder 32 as to permit some leakage of air past it. The end wall 33 of the cylinder is formed with two apertures 34 and 35 serving to allow additional flow of air into or out of the cylinder 32, a pivoted vane 36 being provided which co-operates with the aperture 34 and is manually movable to vary the effective area of that aperture.

A resilient pad 37, mounted on a blade spring 38 secured at 39 to the frame 10, co-operates with the aperture 35 to close or open it. A second cam 41 mounted on the arrestment shaft 21 acts on the blade spring 38 to press the pad 37 on to the surface of the cylinder and close the aperture 35 when the balance beam is released for pre-weighing, and moves away from the spring 38 to allow it to withdraw the pad 37 from the said aperture when the balance beam is released for fine weighing.

The load on the balance is read from a fine scale 42 on the beam 13 by means of a conventional optical system (not shown).

Thus, when the balance beam is in the arrested position, the spring 24 is free and the pad 23 is clear of the knife edge 22. To perform a weighing operation, the body to be weighed is placed in the scale pan, all the weights 18 being on the weight carrier, and the arrestment frame is moved by turning the shaft 21 to the pre-weighing position shown in the drawing, such movement being clockwise from the arrested position as viewed in the drawing, so that the nose 29 remains clear of the spring 24 and the pad 37 continues to be held in a position to cover the aperture 35 in the cylinder 32. The release of the balance beam 13 brings the knife edge 22 into contact with the pad 23 and the spring 24 thus opposes tilting of the beam 13 by the weight, the deflection of the spring due to such weight being a measure of the weight and producing a corresponding deflection of the beam which is read on the scale 42. By choice of suitable material for the spring 24, and of suitable dimensions, the deflection of the beam may be such that one division on the scale 42 represents for example 1 mg. or 0.1 mg. The beam is then again arrested, and weights 18 are removed from the weight carrier to correspond with the scale reading. The beam is then again released, to the fine weighing position, by turning the shaft 21 in an anti-clockwise direction, the cam 26 thus acting on the lever 27 to deflect the spring 24 and move the pad 23 out of the path of the knife edge 22, whilst the cam 41 releases the blade spring 38 and allows the pad 37 to move clear of the aperture 35. The balance now operates at high sensitivity to give an accurate indication of the weight of the article in the scale pan, the exact weight being shown by the reading on the scale 42, where one division now represents say 1 mg. or 0.1 mg.

During pre-weighing, with the aperture 35 closed, a higher degree of damping of the beam movement is provided than during fine weighing, when the aperture 35 is open. The size of the aperture 35 can be selected to provide the required degree of difference between the damping under fine weighing and under pre-weighing conditions, adjustment of the damping, particularly under fine weighing conditions being provided by setting of the vane 36 over the aperture 34.

Although it has been stated above that the springs 24 and 38 are controlled by cams on the arrestment shaft, so that the bringing into operation of the opposing force on the beam, and the change in the damping, are effected by operation of the arrestment mechanism, the said opposing force, and the member varying the damping may be brought into operation by control means separate from the arrestment mechanism and, if desired, separate from each other also. The opposing force, instead of being exerted by a blade spring, may be exerted by a coiled or other form of spring, or by a counterweight.

We claim:

1. A balance for fine weighing having a frame and having a preweighing device embodied therein, said preweighing device comprising a balance beam, a counter weight at one end of said beam, and scale pan weight carrier and weights at the other end balancing said beam, a leaf spring having one end attached to the frame and the other end contacting the beam to selectively apply force to the beam opposing the out-of-balance load when an article to be weighed is added to the scale pan, a scale cooperating with said beam indicating the load in the balance by the deflection of the beam whereby the article is preweighed, and control means including an arrestment shaft and a lever pivoted to the frame between its ends and having one end actuated by the arrestment shaft and the other end contacting the spring and relieving the beam of said resilient force, and upon further relieving the beam of the weights indicated by the said scale, the scale will then indicate the accurate weight of the article.

2. A balance for fine weighing according to claim 1, wherein damping means acting on the balance beam comprises a piston secured to said counter weight moving in a cylinder during swinging of the balance beam to displace air from or draw air into the said cylinder, an air flow orifice in the cylinder wall, means for opening said orifice when the balance beam is released for fine weighing and for closing said orifice when the beam is released for preweighing and said means being operated by a cam on said arrestment shaft.

3. A balance for fine weighing according to claim 2, wherein the opening and closing of the said orifice is affected by movement of a pad mounted on a resilient arm, said arm being acted on by said cam rotated by said arrestment shaft, the cam operating to press the pad against the orifice when the balance beam is released for pre-weighing.

References Cited by the Examiner
UNITED STATES PATENTS

| | | | |
|---|---|---|---|
| 1,806,742 | 5/31 | Cameron | 177—246 X |
| 3,026,954 | 3/62 | Appius | 177—248 |
| 3,055,444 | 9/62 | Chyo | 177—191 |
| 3,106,977 | 10/63 | Wells | 177—184 |
| 3,121,466 | 2/64 | Mittelsteadt | 177—157 |

LEO SMILOW, *Primary Examiner.*